US006690660B2

United States Patent
Kim et al.

(10) Patent No.: US 6,690,660 B2
(45) Date of Patent: Feb. 10, 2004

(54) ADAPTIVE ALGORITHM FOR A CHOLESKY APPROXIMATION

(75) Inventors: Younglok Kim, Fort Lee, NJ (US); Ariela Zeira, Huntington, NY (US)

(73) Assignee: InterDigital Technology Corporation, Wilmington, DE (US)

(*) Notice: Subject to any disclaimer, the term of this patent is extended or adjusted under 35 U.S.C. 154(b) by 71 days.

(21) Appl. No.: 10/153,477

(22) Filed: May 22, 2002

(65) Prior Publication Data

US 2003/0218998 A1 Nov. 27, 2003

(51) Int. Cl.[7] .............................. H04B 7/216; H04B 1/69
(52) U.S. Cl. ..................... 370/335; 375/149; 375/348
(58) Field of Search ................................ 370/335, 342; 375/149, 150, 343, 346

(56) References Cited

U.S. PATENT DOCUMENTS 6,064,689 A     5/2000   Vollmer et al.

FOREIGN PATENT DOCUMENTS

EP          1 065 799 1     *  1/2001

OTHER PUBLICATIONS

Boariu et al., "The Cholesky–Iterative Detector: A New Multiuser Detector for Synchronous CDMA Systems", Mar. 2000, IEEE Communications Letters, vol. 4, No. 3, pp. 77–79.*

Haardt et al., "Comparative Study of Joint–Detection Techniques for TD–CDMA based Mobile Radio Systems", Aug. 2001, IEEE Journal on Selected Areas in Communications, vol. 19, No. 8, pp. 1461–1475.*

H.R. Karimi and N.W. Anderson, "A Novel and Efficient Solution to Block–Based Joint–Detection using Approximate Cholesky Factorization", *Personal, Indoor and Mobile Communications PIMRC' 98*, Conference Proceedings, vol. 3, pp. 1340–1345, Sep. 1998, Boston, MA.

* cited by examiner

Primary Examiner—Melvin Marcelo
Assistant Examiner—Nhat Do
(74) Attorney, Agent, or Firm—Volpe and Koenig, P.C.

(57) ABSTRACT

Data is to be detected in a wireless communication system. A plurality of communication signals are received. A solution for estimating data of the received communication signals is modeled using a linear system requiring a matrix inversion. Columns or rows of an approximate Cholesky factor are determined. A difference between the determined columns or rows is determined. If the determined difference is less than a threshold, subsequent columns or rows are determined by previously determined columns or rows. The data of the received communication signals is estimated using the approximate Cholesky factor.

55 Claims, 2 Drawing Sheets

ADAPTIVE ALGORITHM FOR A CHOLESKY APPROXIMATION

BACKGROUND

This invention generally relates to solving linear systems. In particular, the invention relates to using Cholesky approximations to perform a matrix inversion of a Hermitian, block-banded and block Toeplitz matrix to solve linear systems.

In code division multiple access (CDMA) communication systems, multiple communications may be simultaneously sent over a shared frequency spectrum. Each communication is distinguished by the code used to transmit the communication.

In some CDMA communication systems to better utilize the shared spectrum, the spectrum is time divided into frames having a predetermined number of time slots, such as fifteen time slots. This type of system is referred to as a hybrid CDMA/time division multiple access (TDMA) communication system. One such system, which restricts uplink communications and downlink communications to particular time slots, is a time division duplex communication (TDD) system.

Two approaches to receive the communications transmitted within the shared spectrum is single user detection (SUD) and multiuser detection (MUD). SUD is used when all received communications experience the same channel response. This condition typically occurs in the downlink where all communications are transmitted from the base station or in the uplink where only one user transmits at a particular time. In these cases, all the transmitted communications experience a common channel response. To compensate for the common channel response, all of the received signals are passed through a channel equalization stage. After equalization, the data for each communication is recovered using that communications code.

The single user data detection problem is typically modeled per Equation 1

$$r = Hs + n \qquad \text{Equation 1}$$

r is the received vector. H is the channel response matrix for all the users. n is the noise vector. s is the spread data symbols as per Equation 2.

$$s = Cd \qquad \text{Equation 2}$$

C is the spreading codes of all the users' communications and d is the data vector.

Two common approaches to solve Equation 1 are a least squares errors (LSE) solution and a minimum mean squares (MMSE) solution. Equation 3 is the LSE solution.

$$s = (H^H H)^{-1} H^H r \qquad \text{Equation 3}$$

$(\cdot)^H$ is the complex conjugate transpose (Hermitian) operation. Equation 4 is the MMSE solution.

$$s = (H^H H + \sigma^2 I) - 1 H^H r \qquad \text{Equation 4}$$

$\sigma^2$ is the noise variance and I is the identity matrix.

After solving for s, the data vector d is determined by despreading per Equation 5.

$$d = C^{-1} s \qquad \text{Equation 5}$$

In multiuser detection, all the communications' data is determined together. Multiuser detection can be used when communications experience differing or a common channel response(s). A multiuser detector uses the, known or determined, codes of the multiple communications and the determined channel responses to estimate the data of all the communications.

The multiuser detection problem is typically modeled per Equation 6.

$$r = Ad + n \qquad \text{Equation 6}$$

A is the system response matrix, which is a convolution of the channel response matrix, H, and the code matrix, C.

Two common approaches to solve Equation 6 are a zero-forcing (ZF) solution and a minimum mean square error MMSE solution. Equation 7 is the ZF solution.

$$d = (A^H A)^{-1} A^H r \qquad \text{Equation 7}$$

Equation 8 is the MMSE solution.

$$d = (A^H A + \sigma^2 I)^{-1} A^H r \qquad \text{Equation 8}$$

A brute force solution to Equations 3 and 4 for SUD or Equations 7 and 8 have an extremely high complexity. One approach to reduce complexity is Cholesky decomposition. Cholesky decomposition is explained in conjunction with the linear equation of Equations 9 and 10.

$$p = (R)^{-1} x \qquad \text{Equation 9}$$

$$x = o^H q \qquad \text{Equation 10}$$

For a ZF solution, R is $o^H o$. For a MMSE solution, R is $o^H o + \sigma^2 I$.

Performing a matrix inversion is a complex operation. To reduce the complexity, a Cholesky factor, G, is used when the matrix R is Hermitian block-banded and block Toeplitz. G and its conjugate transpose, $G^H$, are upper and lower triangular matrices. The Cholesky factor, G, is per equation 11.

$$GG^H = R \qquad \text{Equation 11}$$

After the Cholesky factor, G, is determined, backward substitution is performed to determine y per Equation 12.

$$y = G^H q \qquad \text{Equation 12}$$

To determine p, forward substitution is performed per Equation 13.

$$x = y \, G \qquad \text{Equation 13}$$

For SUD, p becomes r and q becomes s in Equations 9 and 10. For a ZF solution, R is $H^H H$ and $o^H$ is $H^H$. For a MMSE solution, R is $H^H H + \sigma^2 I$ and $o^H$ is $H^H$.

For MUD, p becomes r and q becomes d in Equations 9 and 10. For a ZF solution, R is $A^H A$ and $o^H$ is $A^H$. For a MMSE solution, $o^H o$ is $A^H A + \sigma^2 I$ and $o^H$ is $A^H$.

Although the linear system solution based on Cholesky decomposition reduces complexity, determining the Cholesky factor G still involves considerable complexity. To reduce the complexity in determining the Cholesky factor G, an approximate Cholesky factor $\hat{G}$ is used. Approaches to determine $\hat{G}$ have been to determine a column or row of $\hat{G}$ and to replicate that column or row to generate the $\hat{G}$ matrix. The approximation of $\hat{G}$ may introduce an error into the data detection process. This error may reduce performance of the receiver to an unacceptable level.

Accordingly, it is desirable to have alternate approaches for determining the Cholesky factor.

SUMMARY

Data is to be detected in a wireless communication system. A plurality of communication signals are received. A solution for estimating data of the received communication signals is modeled using a linear system requiring a matrix inversion. Columns or rows of an approximate Cholesky factor are determined. A difference between the determined columns or rows is determined. If the determined difference is less than a threshold, subsequent columns or rows are determined by previously determined columns or rows. The data of the received communication signals is estimated using the approximate Cholesky factor.

BRIEF DESCRIPTION OF THE DRAWING(S)

DETAILED DESCRIPTION OF THE PREFERRED EMBODIMENT(S)

The preferred embodiments of the invention can generally be used with any type of CDMA system, such as a TDD/CDMA, TDMA/CDMA or frequency division duplex/CDMA communication system, as well as other types of communication systems. The determination of the Cholesky factor can be used to perform a matrix inversion in a linear system for a variety of applications.

Figure 1:
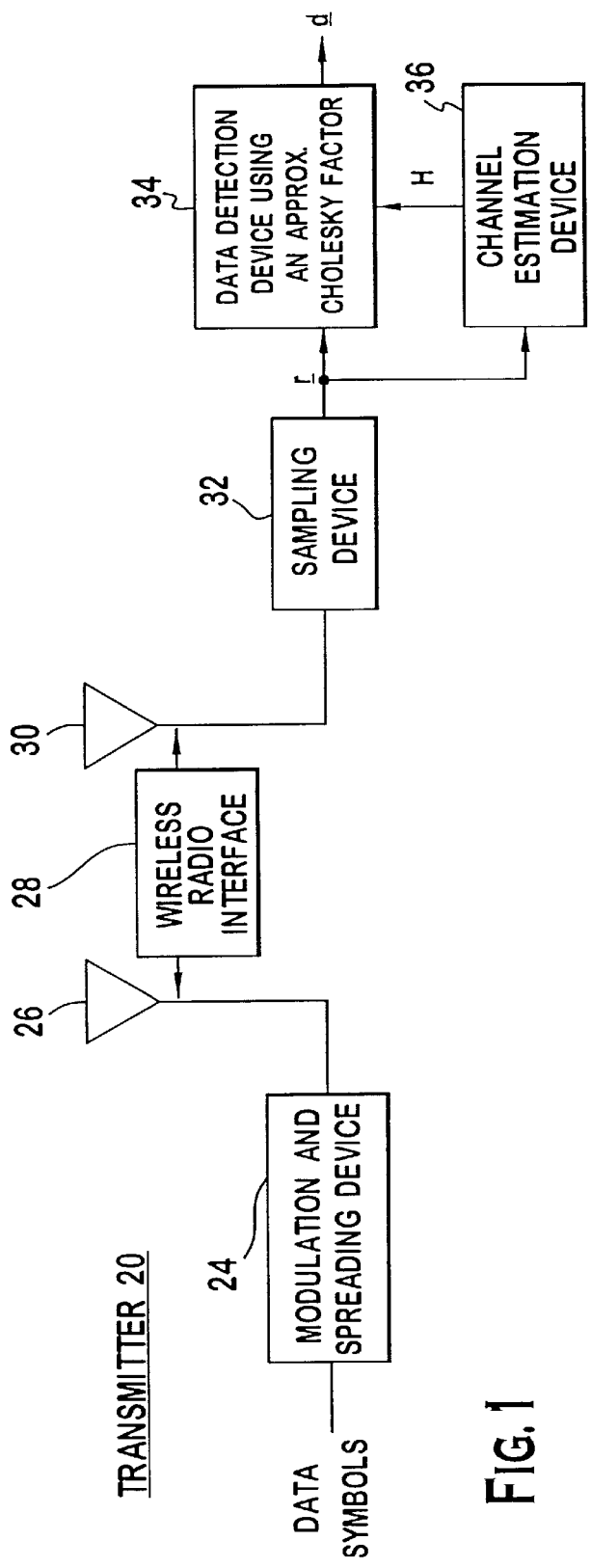
FIG. 1 is an embodiment of a communication system using an approximate Cholesky factor.

FIG. 1 illustrates an embodiment of a communication system using an approximate Cholesky factor. A transmitter 20 and a receiver 22 are shown in FIG. 1. The transmitter 20 may be located at a user equipment or multiple transmitting circuits 20 may be located at the base station. The receiver 22 may be located at either the user equipment, base station or both.

Data symbols to be transmitted to the receiver 22 are processed by a modulation and spreading device 24 at the transmitter 20. The spreading and modulation device 24 spreads the data with the code(s) assigned to the communication(s) carrying the data. The communication(s) are radiated by an antenna 26 or antenna array of the transmitter 20 through a wireless radio interface 28.

At the receiver 22, the communication(s), possibly along with other transmitters' communications, are received at an antenna 30 or antenna array of the receiver 22. The received signal is sampled by a sampling device 32, such as at the chip rate or at a multiple of the chip rate, to produce the received vector, r. The received vector r is processed by a channel estimation device 36 to estimate the channel impulse responses, H, for the received communications. The channel estimation device 36 may use a training sequence in the received communication, a pilot signal or another technique to estimate the impulse responses. A data detection device using an approximate Cholesky factor 34, such as a SUD or MUD, uses the code(s) of the received communication(s) and the estimated impulse response(s) to estimate soft symbols, d, of the spread data.

For a data detector using SUD, the data detector uses the received vector r and channel response matrix H (and for a MMSE solution the noise variance $\sigma^2$) to determine the spread data, s using an approximate Cholesky factor. The spread data vector s is despread using the user codes C. For a data detector 34 using MUD, the data detector 34 uses the received vector r and the system response matrix A (and for a MMSE solution the noise variance $\sigma^2$) to determine the spread data, d using an approximate Cholesky factor. The system response matrix A is determined using the channel responses H and the user codes C.

Figure 2:
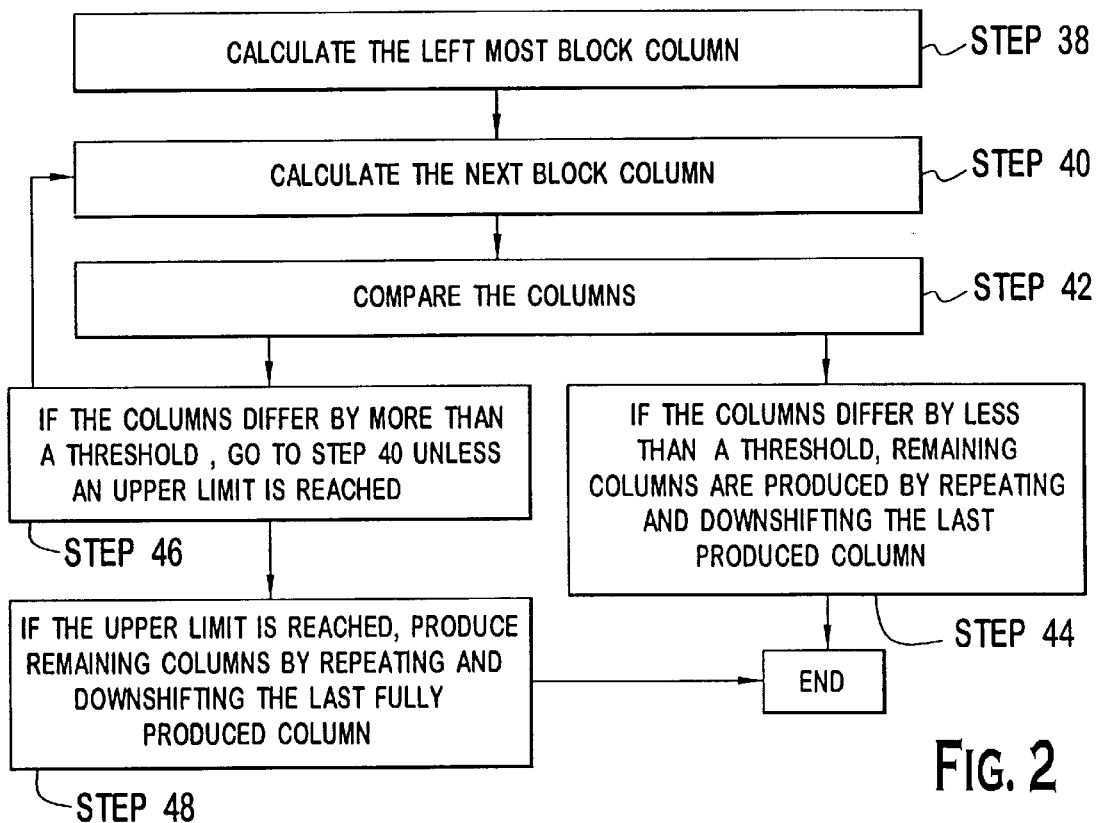
FIG. 2 is a flow chart of determining an approximate lower triangular Cholesky factor by columns.

The data detector 34 uses an approximate Cholesky factor to estimate the data as per FIG. 2. The approximate Cholesky factor is either an upper or a lower triangular matrix. The following discussion addresses one embodiment which repeats block columns in a lower triangular G factor to produce an approximate Cholesky factor. However, the same approach can be used to repeat rows in a lower triangular matrix or repeat columns or rows in an upper triangular matrix.

Figure 3:
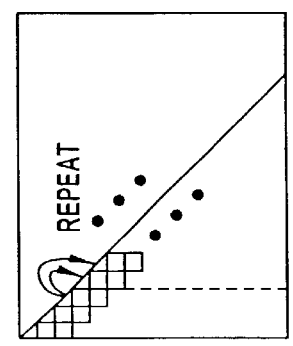
FIG. 3 is an illustration of an approximate lower triangular Cholesky factor determined by columns.

FIG. 3 illustrates an approximate Cholesky factor being lower triangular and produced by repeating columns. The Cholesky factor matrix has blocks of dimension K by K. K is the number of user communications being processed. Each block column of the matrix has a predetermined length, such as L or 2L. L is the number of symbols that influence each other by intersymbol interference (ISI). Preferably, each block column is 2L blocks in length, which simulations indicate has a negligible degradation depending on the fading channel.

The factor is preferable calculated starting with the leftmost column, step 38. Each block of the column is determined, preferably, from top block to bottom block. After the first column is determined, the determination of blocks in the next column is started, preferably from top to bottom. As shown, the next column is one block lower in the matrix. Entries of the leftmost block column are compared to entries of the next column, such as per a threshold test, step 40. If the comparison of the two columns indicates that the differences between the columns is less than the threshold, the remaining columns are produced by repeating and moving down one block the last produced column, step 44. If the comparison is greater than the threshold, the next column is calculated, step 46 and 40. This just calculated column is compared to the previous column. This process is repeated until the two last produced columns pass the comparison test or an upper limit in the produced columns is reached. If the upper limit is reached, the remaining columns are produced by repeating the last fully produced or upper limit column, step 48.

Although the entire columns may be compared or a sampling of entries in each column, preferably, the top blocks in each column are compared. By comparing only the top blocks, the rest of the column can be produced by replication of the previous column.

One threshold test calculates an error between the top block of the two columns, column A and B. The error is determined by an error function, which takes the difference between the normalized A and B block matrices. One example of an error function is per Equation14.

$$error(A, B) = \frac{norm(A - B)}{\sqrt{norm(A) \cdot norm(B)}} \quad \text{Equation 14}$$

The notation norm denotes the matrix norm. If the error is less than the threshold, the remaining columns are produced by repeating the last fully determined column. If the error exceeds the threshold, the rest of the column is determined along with the top block of the next column for use in another threshold test.

Using the threshold test allows the Cholesky factor to be determined with a certain accuracy. As a result, the accuracy of the data detection can similarly be controlled.

Figure 6:
FIG. 6 is an illustration of an approximate upper triangular Cholesky factor determined by rows.
Figure 5:
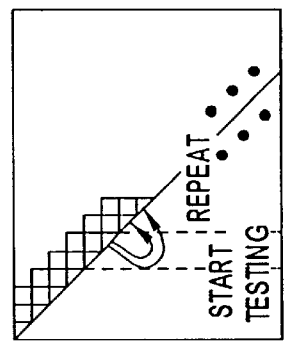
FIG. 5 is an illustration of an approximate upper triangular Cholesky factor determined by columns.
Figure 4:
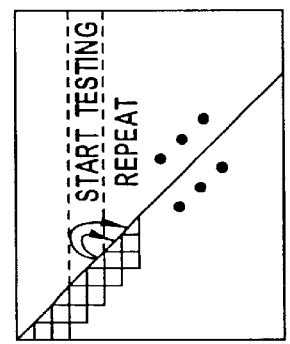
FIG. 4 is an illustration of an approximate lower triangular Cholesky factor determined by rows.

Although computing the Cholesky factor was illustrated for repeating columns for a lower triangular matrix, the repeating can be performed for a row or column of a lower or upper triangular matrix. FIG. 4 illustrates repeating the rows of a lower triangular matrix, FIG. 5 illustrates repeating columns of an upper triangular matrix and FIG. 6 illustrates repeating the rows of an upper triangular matrix. Since the first rows of a lower triangular matrix and the first columns of an upper triangular matrix do not have all the elements of a representative row/column, the threshold test is not performed until the $L^{th}$ row/column is determined.

Figure 7:
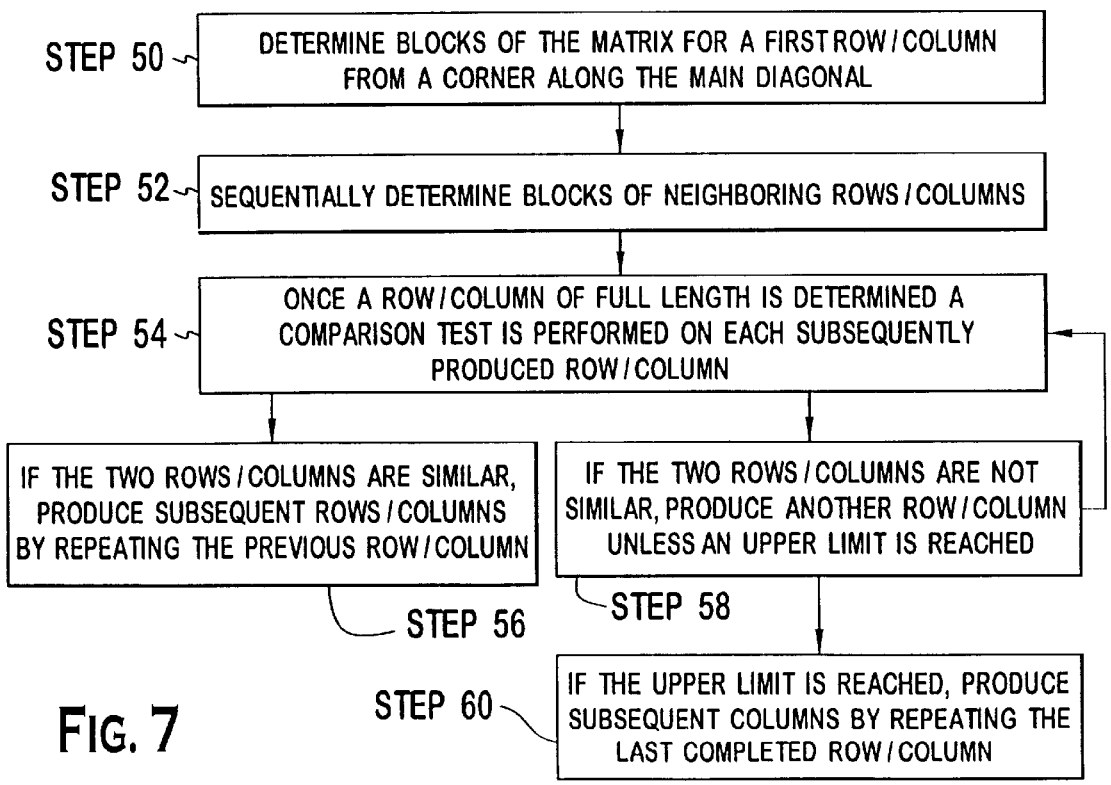
FIG. 7 is a flow chart of generally determining a Cholesky factor either by columns or rows.

In general, the determining of the Cholesky factor is as follows as shown in FIG. 7 for either a row or column of a lower or upper triangular matrix. Blocks of the matrix are determined from a corner along the main diagonal. Although it is preferred to use the upper left most corner, the lower right most corner may be used. Blocks of the first row/column, at the corner, are determined, step 50. Sequentially, the blocks of the neighboring rows/columns are determined, step 52. Once a row/column of full length is determined, a comparison test is performed on each subsequently produced row/column, step 54. If the two rows/columns are similar enough, subsequent rows/columns are produced by repeating the previous row/column, step 56. If the comparison is not favorable, a next row/column is determined, step 58. This procedure is repeated until a favorable comparison results or, alternately, an upper limit is reached. If the an upper limit is reached, subsequent rows/columns are produced by repeating the last completed row/column, step 60.

The approximate Cholesky factor is used to determine the data of the received communications, such as in a SUD or MUD using ZF or MMSE data detection approaches.

What is claimed is:

1. A method for detecting data in a wireless communication system, the method comprising:
   receiving a plurality of communication signals;
   modeling a solution for estimating data of the received communication signals using a linear system requiring a matrix inversion;
   determining columns or rows of an approximate Cholesky factor;
   determining a difference between the determined columns or rows;
   if the determined difference is less than a threshold, determining subsequent columns or rows by repeating previously determined columns or rows; and
   estimating the data of the received communication signals using the approximate Cholesky factor.

2. The method of claim 1 further comprising repeating previously determined columns or rows, if a number of previously determined columns or rows exceeds an upper limit.

3. The method of claim 1 wherein the linear system is modeled using a minimum mean square error approach.

4. The method of claim 1 wherein the linear system is modeled using a zero forcing approach.

5. The method of claim 1 wherein the approximate Cholesky factor is lower triangular.

6. The method of claim 1 wherein the approximate Cholesky factor comprises a plurality of K by K blocks and K is a number of the received signals.

7. The method of claim 6 wherein the approximate Cholesky factor is determined by columns.

8. The method of claim 7 wherein block columns are L blocks in length and L is the longest length of intersymbol interference.

9. The method of claim 7 wherein block columns are 2L blocks in length and L is the longest length of intersymbol interference.

10. The method of claim 1 wherein the comparison comprises determining an error between normalized blocks of the columns or rows.

11. The method of claim 1 wherein the comparison compares a first determined block of a newly determined column or row to a corresponding block of a previously determined column or row, prior to determining subsequent blocks of the newly determined column or row.

12. A user equipment comprising:
    means for receiving a plurality of communication signals;
    means for estimating data of the received communication signals using a linear system requiring a matrix inversion;
    means for determining columns or rows of an approximate Cholesky factor;
    means for determining a difference between the determined columns or rows;
    means if the determined difference is less than a threshold, for determining subsequent columns or rows by repeating previously determined columns or rows; and
    means for estimating the data of the received communication signals using the approximate Cholesky factor.

13. The user equipment of claim 12 further comprising means for repeating previously determined columns or rows, if a number of previously determined columns or rows exceeds an upper limit.

14. The user equipment of claim 12 wherein the linear system is modeled using a minimum mean square error approach.

15. The user equipment of claim 12 wherein the linear system is modeled using a zero forcing approach.

16. The user equipment of claim 12 wherein the approximate Cholesky factor is lower triangular.

17. The user equipment of claim 12 wherein the approximate Cholesky factor comprises a plurality of K by K blocks and K is a number of the received signals.

18. The user equipment of claim 17 wherein the approximate Cholesky factor is determined by columns.

19. The user equipment of claim 18 wherein block columns are L blocks in length and L is the longest length of intersymbol interference.

20. The user equipment of claim 18 wherein block columns are 2L blocks in length and L is the longest length of intersymbol interference.

21. The user equipment of claim 12 wherein the comparison comprises determining an error between normalized blocks of the columns or rows.

22. The user equipment of claim 12 wherein the comparison compares a first determined block of a newly determined column or row to a corresponding block of a previously determined column or row, prior to determining subsequent blocks of the newly determined column or row.

23. A user equipment comprising:
an antenna for receiving a plurality of communication signals;
a data estimation device for estimating data of the received communication signals using a linear system requiring a matrix inversion; for determining columns or rows of an approximate Cholesky factor; for determining a difference between the determined columns or rows; if the determined difference is less than a threshold, for determining subsequent columns or rows by repeating previously determined columns or rows; and for estimating the data of the received communication signals using the approximate Cholesky factor.

24. The user equipment of claim 23 wherein the data detection device further for repeating previously determined columns or rows, if a number of previously determined columns or rows exceeds an upper limit.

25. The user equipment of claim 23 wherein the linear system is modeled using a minimum mean square error approach.

26. The user equipment of claim 23 wherein the linear system is modeled using a zero forcing approach.

27. The user equipment of claim 23 wherein the approximate Cholesky factor is lower triangular.

28. The user equipment of claim 23 wherein the approximate Cholesky factor comprises a plurality of K by K blocks and K is a number of the received signals.

29. The user equipment of claim 28 wherein the approximate Cholesky factor is determined by columns.

30. The user equipment of claim 29 wherein block columns are L blocks in length and L is the longest length of intersymbol interference.

31. The user equipment of claim 29 wherein block columns are 2L blocks in length and L is the longest length of intersymbol interference.

32. The user equipment of claim 23 wherein the comparison comprises determining an error between normalized blocks of the columns or rows.

33. The user equipment of claim 23 wherein the comparison compares a first determined block of a newly determined column or row to a corresponding block of a previously determined column or row, prior to determining subsequent blocks of the newly determined column or row.

34. A base station comprising:
means for receiving a plurality of communication signals;
means for estimating data of the received communication signals using a linear system requiring a matrix inversion;
means for determining columns or rows of an approximate Cholesky factor;
means for determining a difference between the determined columns or rows;
means if the determined difference is less than a threshold, for determining subsequent columns or rows by repeating previously determined columns or rows; and
means for estimating the data of the received communication signals using the approximate Cholesky factor.

35. The base station of claim 34 further comprising means for repeating previously determined columns or rows, if a number of previously determined columns or rows exceeds an upper limit.

36. The base station of claim 34 wherein the linear system is modeled using a minimum mean square error approach.

37. The base station of claim 34 wherein the linear system is modeled using a zero forcing approach.

38. The base station of claim 34 wherein the approximate Cholesky factor is lower triangular.

39. The base station of claim 34 wherein the approximate Cholesky factor comprises a plurality of K by K blocks and K is a number of the received signals.

40. The base station of claim 39 wherein the approximate Cholesky factor is determined by columns.

41. The base station of claim 40 wherein block columns are L blocks in length and L is the longest length of intersymbol interference.

42. The base station of claim 40 wherein block columns are 2L blocks in length and L is the longest length of intersymbol interference.

43. The base station of claim 34 wherein the comparison comprises determining an error between normalized blocks of the columns or rows.

44. The base station of claim 34 wherein the comparison compares a first determined block of a newly determined column or row to a corresponding block of a previously determined column or row, prior to determining subsequent blocks of the newly determined column or row.

45. A base station comprising:
an antenna for receiving a plurality of communication signals;
a data estimation device for estimating data of the received communication signals using a linear system requiring a matrix inversion; for determining columns or rows of an approximate Cholesky factor; for determining a difference between the determined columns or rows; if the determined difference is less than a threshold, for determining subsequent columns or rows by repeating previously determined columns or rows; and for estimating the data of the received communication signals using the approximate Cholesky factor.

46. The base station of claim 45 wherein the data detection device further for repeating previously determined columns or rows, if a number of previously determined columns or rows exceeds an upper limit.

47. The base station of claim 45 wherein the linear system is modeled using a minimum mean square error approach.

48. The base station of claim 45 wherein the linear system is modeled using a zero forcing approach.

49. The base station of claim 45 wherein the approximate Cholesky factor is lower triangular.

50. The base station of claim 45 wherein the approximate Cholesky factor comprises a plurality of K by K blocks and K is a number of the received signals.

51. The base station of claim 50 wherein the approximate Cholesky factor is determined by columns.

52. The base station of claim 51 wherein block columns are L blocks in length and L is the longest length of intersymbol interference.

53. The base station of claim 51 wherein block columns are 2L blocks in length and L is the longest length of intersymbol interference.

54. The base station of claim 45 wherein the comparison comprises determining an error between normalized blocks of the columns or rows.

55. The base station of claim 45 wherein the comparison compares a first determined block of a newly determined column or row to a corresponding block of a previously determined column or row, prior to determining subsequent blocks of the newly determined column or row.

* * * * *